United States Patent
Hirano

(10) Patent No.: US 8,578,776 B2
(45) Date of Patent: Nov. 12, 2013

(54) ACCELERATION AND ANGULAR VELOCITY DETECTION DEVICE

(75) Inventor: Kenji Hirano, Kariya (JP)

(73) Assignee: DENSO CORPORATION, Kariya (JP)

(*) Notice: Subject to any disclaimer, the term of this patent is extended or adjusted under 35 U.S.C. 154(b) by 188 days.

(21) Appl. No.: 13/300,082

(22) Filed: Nov. 18, 2011

(65) Prior Publication Data

US 2012/0125105 A1 May 24, 2012

(30) Foreign Application Priority Data

Nov. 22, 2010 (JP) ................. 2010-260004

(51) Int. Cl.
*G01P 15/125* (2006.01)

(52) U.S. Cl.
USPC ............ 73/514.32; 73/514.02; 73/511

(58) Field of Classification Search
USPC ................. 73/514.32, 514.02, 511
See application file for complete search history.

(56) References Cited

U.S. PATENT DOCUMENTS

| | | | |
|---|---|---|---|
| 6,948,367 B2* | 9/2005 | Campbell et al. ............ 73/510 |
| 2004/0045355 A1* | 3/2004 | Schaumann ............ 73/514.32 |
| 2005/0204815 A1 | 9/2005 | Mase et al. |
| 2006/0162454 A1* | 7/2006 | Manninen ............ 73/514.32 |
| 2009/0140356 A1 | 6/2009 | Yazdi |
| 2010/0123406 A1 | 5/2010 | Soma et al. |
| 2011/0234441 A1 | 9/2011 | Makihara et al. |

FOREIGN PATENT DOCUMENTS

| | | | |
|---|---|---|---|
| JP | 09026323 A | * | 1/1997 |
| JP | A-10-318755 | | 12/1998 |
| JP | A-2000-97708 | | 4/2000 |
| JP | A-2002-213962 | | 7/2002 |
| JP | A-2004-28869 | | 1/2004 |
| JP | 2005-274458 A | | 10/2005 |
| JP | 2005-308657 A | | 11/2005 |
| JP | A-2008-64528 | | 3/2008 |
| JP | 2008-102091 A | | 5/2008 |
| JP | 2009198265 A | * | 9/2009 |
| JP | 2010-169522 A | | 8/2010 |

* cited by examiner

*Primary Examiner* — Peter Macchiarolo
*Assistant Examiner* — Rose M Miller
(74) *Attorney, Agent, or Firm* — Posz Law Group, PLC

(57) ABSTRACT

An acceleration and angular velocity detection device includes a first oscillation element and a second oscillation element that are movable in a direction along a first axis and a direction along a second axis, an oscillating portion oscillating the first and second oscillation elements in opposite directions along the first axis, a first detection capacitance element and a second detection capacitance element whose capacitances change in a complementary way in accordance with a displacement of the first oscillation element, a third detection capacitance element and a fourth detection capacitance element whose capacitances change in a complementary way in accordance with a displacement of the second oscillation element, a charge amplifier having a fully differential structure, and a detecting portion detecting an acceleration and an angular velocity of a rotation.

7 Claims, 9 Drawing Sheets

ACCELERATION AND ANGULAR VELOCITY DETECTION DEVICE

CROSS REFERENCE TO RELATED APPLICATION

This application is based on Japanese Patent Application No. 2010-260004 filed on Nov. 22, 2010, the disclosure of which is incorporated herein by reference.

TECHNICAL FIELD

The present invention relates to an acceleration and angular velocity detection device that has a detecting capacitance element and detects an acceleration and an angular velocity according to a change in a capacitance of the detecting capacitance element.

BACKGROUND

JP-A-H10-318755 and JP-4120779 disclose some configuration examples of oscillation-type acceleration and angular velocity detection devices. JP-A-H10-318755 discloses an acceleration and angular velocity detection device that has a plurality of charge amplifiers. The charge amplifiers convert a plurality of capacitance signals, in which an oscillation component depending on an acceleration and an oscillation component depending on an angular velocity are mixed with each other, to voltage signals. In this configuration, the voltage signals, which are converted from the capacitance signals, are calculated by a calculation circuit formed of a plurality of operational amplifiers to detect the acceleration and the angular velocity separately. Further, a fully differential operational amplifier may be used in this configuration. JP-4120779 discloses an acceleration and angular velocity detection device in which a time division signal is applied to an output terminal of a capacitance detection element to separate an oscillation component depending on an acceleration and an oscillation component depending on an angular velocity by time division. The separated oscillation components are converted to voltage signals by single charge amplifier.

Because the acceleration and angular velocity detection device disclosed in JP-A-H10-318755 needs a plurality of charge amplifiers and a plurality of operational amplifiers, a circuit size increases. The acceleration and angular velocity detection device disclosed in JP-4120779 is formed under a condition that a signal (capacitance signal) generated by oscillation elements (capacitance detection elements) is a single-system signal. Therefore, a single-end input charge amplifier needs to be used. In a case where the single-end input charge amplifier is used, a detection accuracy may not be sufficiently increased due to common-mode noise.

SUMMARY

In view of the foregoing problems, it is an object of the present disclosure to provide an acceleration and angular velocity detection device in which a detection accuracy of an acceleration and a detection accuracy of an angular velocity can be improved without increasing a circuit area.

According to a first aspect of the present disclosure, an acceleration and angular velocity detection device includes a first oscillation element and a second oscillation element that are movable in a direction along a first axis and a direction along a second axis, the first axis being perpendicular to the second axis, an oscillating portion oscillating the first oscillation element and the second oscillation element in opposite directions along the first axis, a first detection capacitance element and a second detection capacitance element whose capacitances change in a complementary way in accordance with a displacement of the first oscillation element in the direction along the second axis, a third detection capacitance element and a fourth detection capacitance element whose capacitances change in a complementary way in accordance with a displacement of the second oscillation element in the direction along the second axis, a charge amplifier having a fully differential structure, the charge amplifier converting a capacitance change in the first detection capacitance element, the second detection capacitance element, the third detection capacitance element and the fourth detection capacitance element to a voltage signal and outputting the voltage signal as an output signal and a detecting portion detecting an acceleration in the direction along the second axis and an angular velocity of a rotation around a third axis that is perpendicular to the first axis and the second axis according to the output signal of the charge amplifier. The charge amplifier includes an operational amplifier, an input switching portion, a first integration capacitance group, a second integration capacitance group, an integration capacitance element switching portion, and a reset switching portion. The input switching portion switches over an input signal to the operational amplifier, the integration capacitance element switching portion controls a switchover of coupling states of the first integration capacitance group and the second integration capacitance group so that at least one of the first integration capacitance group and the second integration capacitance group is coupled to the operational amplifier to work as a feedback capacitance. The reset switching portion short-circuits two terminals of each of the first integration capacitance group and the second integration capacitance group. The detecting portion includes a switch controlling portion controlling the input switching portion, the integration capacitance element switching portion and the reset switching portion. In a first detecting state, the switch controlling portion controls the input switching portion in such a manner that the capacitance change in the first detection capacitance element and the capacitance change in the third detection capacitance element are added and are input to one input terminal of the operational amplifier, and the capacitance change in the second detection capacitance element and the capacitance change in the fourth detection capacitance element are added and are input to the other input terminal of the operational amplifier, and the switch controlling portion controls the integration capacitance element switching portion in such a manner that the first integration capacitance group works as the feedback capacitance. In a second detecting state, the switch controlling portion controls the input switching portion in such a manner that the capacitance change in the first detection capacitance element and the capacitance change in the fourth detection capacitance element are added and are input to one input terminal of the operational amplifier, and the capacitance change in the second detection capacitance element and the capacitance change in the third detection capacitance element are added and are input to the other input terminal of the operational amplifier, and the switch controlling portion controls the integration capacitance element switching portion in such a manner that the second integration capacitance group works as the feedback capacitance. The switch controlling portion controls the reset switching portion to short-circuit the two terminals of one of the first integration capacitance group and the second integration capacitance group after a switchover between the first detecting state and the second detecting state. The detecting portion detects the acceleration in the direction along the second axis according to the output signal of the charge amplifier in the first detecting state, and detects the angular velocity of the rotation around the third axis according to the output signal of the charge amplifier in the second detecting state.

In the above-described acceleration and angular velocity detection device, the detection accuracy of the acceleration and the detection accuracy of the angular velocity can be improved without increasing the circuit area.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

Figure 1:
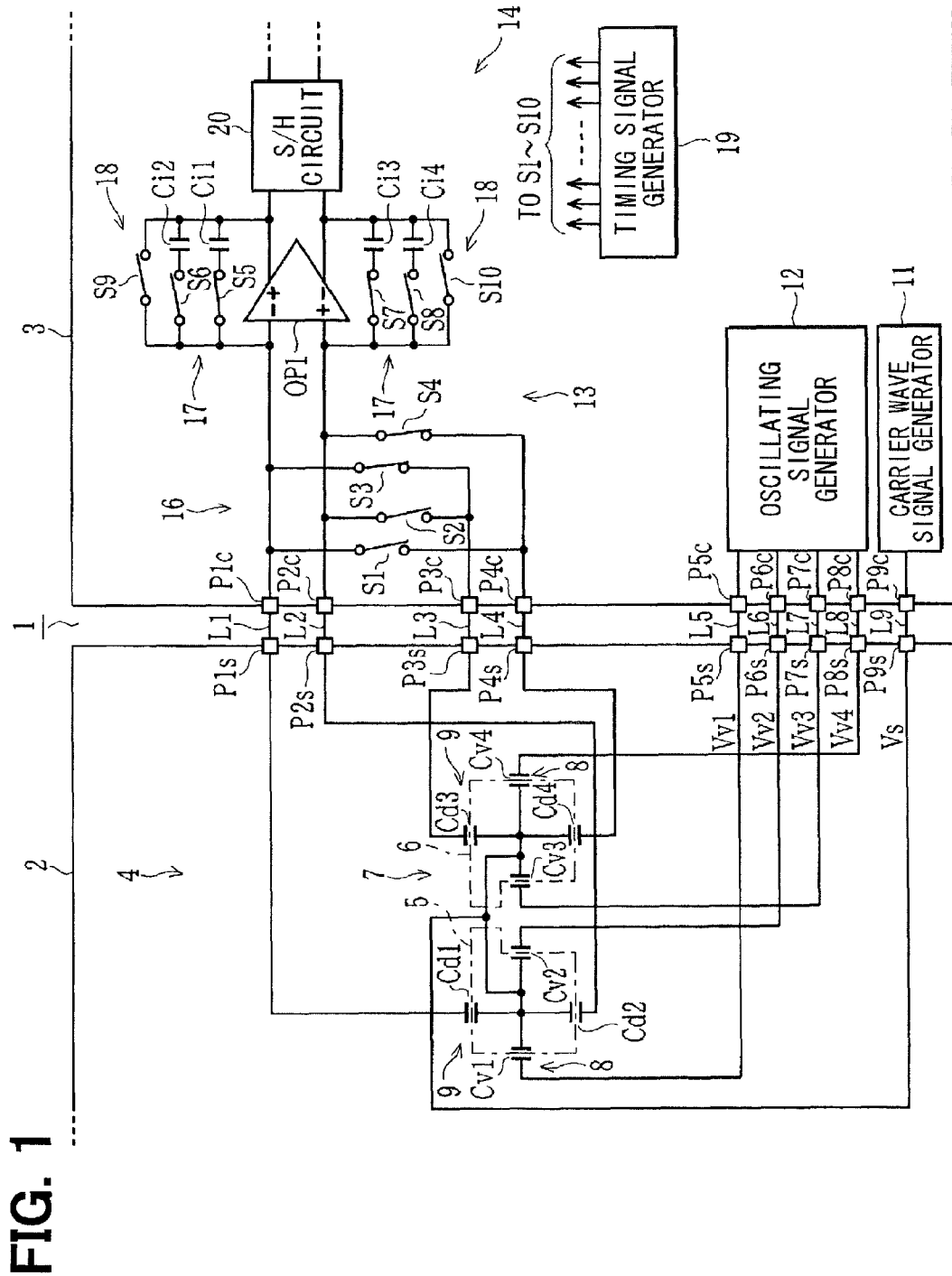
FIG. 1 is a block diagram of an acceleration and angular velocity detection device according to a first embodiment of the present disclosure.

A first embodiment of the present disclosure will be described with reference to FIG. 1 to FIG. 3. As shown in FIG. 1, an acceleration and angular velocity detection device 1 includes a sensor chip 2 and a circuit chip 3. Terminals P1s to P9s of the sensor chip 2 are respectively coupled to terminals P1c to P9c of the circuit chip 3 via respective connecting lines L1 to L9.

The sensor chip 2 has a sensor portion 4. The sensor portion 4 has a movable part 7, an oscillating part 8 and an outputting part 9. The oscillating part 8 can work as an oscillating portion. The movable part 7 has oscillation elements 5 and 6. The oscillation element 5 is movable in an x-axis direction and the oscillation element 6 is movable in a y-axis direction. For example, the x-axis direction is a direction along a first axis and the y-axis direction is a direction along a second axis. The x-axis direction and the y-axis direction are perpendicular to each other in a horizontal plane. The oscillating part 8 is formed around the movable part 7.

The oscillating part 8 has oscillation capacitance elements Cv1 to Cv4. The oscillation capacitance elements Cv1 to Cv4 are provided to generate an electrostatic force so that the oscillation elements 5 and 6 move (oscillate) in opposite directions along the x-axis direction. The oscillation element 5 can work as a first oscillation element and the oscillation element 6 can work as a second oscillation element. A first part of the oscillation element 5 provides an electrode of the oscillation capacitance element Cv1 and a second part of the oscillation element 5 provides an electrode of the oscillation capacitance element Cv2. The two electrodes provided by the oscillation element 5 are movable with the oscillation element 5. A first part of the oscillation element 6 provides an electrode of the oscillation capacitance element Cv3 and a second part of the oscillation element 6 provides an electrode of the oscillation capacitance element Cv4. The two electrodes provided by the oscillation element 6 are movable with the oscillation element 6. Each of the movable electrodes of the oscillation capacitance elements Cv1 to Cv4 is coupled in common. A carrier wave Vs, which is transferred from the circuit chip 3, is applied to each of the movable electrodes of the oscillation capacitance elements Cv1 to Cv4 via the terminal P9s and the connecting line L9. The carrier wave Vs (modulation signal, carrier signal) is a square wave having a predetermined frequency and a predetermined amplitude. The predetermined frequency is sufficiently higher than resonance frequency of the oscillation elements 5 and 6. The other electrode of each of the oscillation capacitance elements Cv1 to Cv4 is a fixed electrode. Oscillating signals Vv1 to Vv4, which are transferred from the circuit chip 3, are applied to the fixed electrodes of the oscillation capacitance elements Cv1 to Cv4 via the respective terminals P5s to P8s and respective connecting lines L5 to L8.

The outputting part 9 has a pair of detection capacitance elements Cd1 and Cd2 and a pair of detection capacitance elements Cd3 and Cd4. Capacitances of the detection capacitance elements Cd1 and Cd2 change in a complementary way in accordance with a displacement of the oscillation element 5 in the y-axis direction. Capacitances of the detection capacitance elements Cd3 and Cd4 change in a complementary way in accordance with a displacement of the oscillation element 6 in the y-axis direction. The detection capacitance elements Cd1 to Cd4 can work as first to fourth detection capacitance elements. The detection capacitance elements Cd1 to Cd4 have a same initial capacitance (C) in initial states (a state before the capacitances of the detection capacitance elements change in accordance with the displacements of the oscillation elements 5 and 6). A third part of the oscillation element 5 provides an electrode of the detection capacitance element Cd1 and a fourth part of the oscillation element 5 provides an electrode of the detection capacitance element Cd2. The two electrodes provided by the oscillation element 5 are movable with the oscillation element 5. A third part of the oscillation element 6 provides an electrode of the detection capacitance element Cd3 and a fourth part of the oscillation element 6 provides an electrode of the detection capacitance element Cd4. The two electrodes provided by the oscillation element 6 are movable with the oscillation element 6. Each of the movable electrodes of the detection capacitance elements Cd1 to Cd4 is coupled in common. The carrier wave Vs, which is transferred from the circuit chip 3, is applied to each of the movable electrodes of the detection capacitance elements Cd1 to Cd4 via the terminal P9s and the connecting line L9. The other electrode of each of the detection capacitance elements Cd1 to Cd4 is a fixed electrode. The fixed electrodes of the detection capacitance elements Cd1 to Cd4 are respectively coupled to the terminals P1s to P4s.

The oscillation elements 5 and 6 oscillate constantly when the oscillating signals Vv1 to Vv4 transferred from the circuit chip 3 are appropriately controlled. The oscillation elements 5 and 6 oscillate in opposite directions along the x-axis direction. In this structure, when an acceleration in the y-axis direction is applied to the sensor portion 4, the oscillation elements 5 and 6 formed in the movable part 7 oscillate with an amplitude in accordance with the acceleration value. In this case, the oscillation elements 5 and 6 oscillate in the same direction along the y-axis direction and oscillating states of the oscillation elements 5 and 6 are shown as capacitance changes in the detection capacitance elements Cd1 to Cd4 formed in the outputting part 9. Specifically, the capacitances of the detection capacitance elements Cd1 and Cd3 change the same amount (+ΔC1). The capacitances of the detection capacitance elements Cd2 and Cd4 change the same amount (−ΔC1), which is complementary to the change amount (+ΔC1) of the detection capacitance elements Cd1 and Cd3. For example, when a distance between the detection capacitance elements Cd1 and Cd3 decreases and the capacitance therebetween increases by ΔC1, a distance between the detection capacitance elements Cd2 and Cd4 will increase and the capacitance therebetween will decrease by ΔC1.

Further, in the above-described structure, when a rotation around a z-axis is applied to the sensor portion 4, a Coriolis force depending on an angular velocity of the rotation generates an oscillation in the y-axis direction. In this case, the oscillation elements 5 and 6 oscillate in opposite directions along the y-axis direction and oscillating states of the oscillation elements 5 and 6 are shown as capacitance changes in the detection capacitance elements Cd1 to Cd4 formed in the outputting part 9. Specifically, the capacitances of the detection capacitance elements Cd1 and Cd4 change the same amount (+ΔC2). The capacitances of the detection capacitance elements Cd2 and Cd3 change the same amount (−ΔC2), which is complementary to the change amount (+ΔC2) of the detection capacitance elements Cd1 and Cd4. For example, when a distance between the detection capacitance elements Cd1 and Cd4 decreases and the capacitance therebetween increases by ΔC2, a distance between the detection capacitance elements Cd2 and Cd3 will increase and the capacitance therebetween will decrease by ΔC2.

The circuit chip 3 has a carrier wave signal generator 11, an oscillating signal generator 12, a charge amplifier 13 and a detecting part 14. The carrier wave signal generator 11 generates the carrier wave Vs. The carrier wave Vs is supplied to the sensor chip 2 via the terminal P9c and the connecting line L9. The oscillating signal generator 12 generates oscillating signals Vv1 to Vv4. The oscillating signals Vv1 to Vv4 are supplied to the oscillating part 8 of the sensor chip 2 via the terminals P5c to P8c and the connecting lines L5 to L8. The fixed electrodes of the oscillation capacitance elements Cv1 to Cv4 formed in the oscillating part 8 receive the oscillating signals Vv1 to Vv4 and generate the electrostatic forces, which move the oscillation elements 5 and 6 in the x-axis direction. The oscillating signal generator 12 receives x-axis oscillating signals (not shown), which show x-axis oscillation components of the oscillation elements 5 and 6, from the sensor chip 2. The oscillating signal generator 12 controls a generation of the oscillating signals Vv1 to Vv4 in a feedback control manner based on the x-axis oscillating signals so that the oscillation elements 5 and 6 oscillate with a predetermined amplitude and a predetermined frequency in the x-axis direction.

The charge amplifier 13 is a capacitance to voltage (C/V) converting circuit having a fully differential structure. The charge amplifier 13 converts capacitance change in the detection capacitance elements Cd1 to Cd4 formed in the sensor chip 2 to voltage signal, and outputs the voltage signal. The charge amplifier 13 includes a fully differential operational amplifier OP1, integration capacitance elements Ci1 to Ci4 and switching elements S1 to S10. The switching elements S1 to S10 shown by simple switch symbols in FIG. 1 actually have structures shown in FIG. 2. That is, as shown in FIG. 2, each of the switching elements S1 to S10 is formed as an analogue switch 15, which is formed of a complementary metal oxide semiconductor (CMOS) having an n-channel metal oxide semiconductor (MOS) transistor M1 and a p-channel MOS transistor M2.

In the present embodiment, the switching elements S1 to S4 form an input switching portion 16 to control input (coupling state between the detection capacitance elements Cd1 to Cd4 and the operational amplifier OP1) to the operational amplifier OP1. The switching elements S5 to S8 form an integration capacitance element switching portion 17 to switch over the integration capacitance elements Ci1 to Ci4. The switching elements S9 and S10 form a reset switching portion 18.

The terminal P1c is coupled to an inverting input terminal (one input terminal) of the operational amplifier OP1 and the terminal P2c is coupled to a non-inverting input terminal (the other input terminal) of the operational amplifier OP1. The terminal P1c is coupled with the terminal P4c via the switching element S1, and is also coupled with the terminal P3c via the switching element S3. The terminal P2c is coupled with the terminal P3c via the switching element S2, and is also coupled with the terminal P1c via the switching element S4. The switching elements S1 to S4 can work as first to fourth switching elements, respectively.

The switching element S5 and the integration capacitance element Ci1, coupled in series, the switching element S6 and the integration capacitance element Ci2, coupled in series, and the switching element S9 are coupled in parallel between the inverting input terminal and a non-inverting output terminal of the operational amplifier OP1. The switching element S7 and the integration capacitance element Ci3, coupled in series, the switching element S8 and the integration capacitance element Ci4, coupled in series, and the switching element S10 are coupled in parallel between the non-inverting input terminal and an inverting output terminal of the operational amplifier OP1. The capacitance of the integration capacitance element Ci1 is equal to the capacitance of the integration capacitance element Ci3. The capacitance of the integration capacitance element Ci2 is equal to the capacitance of the integration capacitance element Ci4. The integration capacitance element Ci1 and the integration capacitance element Ci3 are included in a first integration capacitance group. The integration capacitance element Ci2 and the integration capacitance element Ci4 are included in a second integration capacitance group.

The detecting part 14 detects an acceleration in the y-axis direction and an angular velocity of a rotation around the z-axis, which are externally-applied to the sensor portion 4, based on an output signal of the charge amplifier 13. The detecting part 14 includes a timing signal generator 19 and a sample and hold circuit 20 (hereafter referred to as an S/H circuit 20). The detecting part 14 can work as a detecting portion. The timing signal generator 19 can work as a switch controlling portion.

The carrier wave Vs is input to the timing signal generator 19 (not shown). The timing signal generator 19 generates timing signals in synchronization with the carrier wave Vs and controls the switching elements S1 to S10 to switch over based on the timing signals. The carrier wave Vs, switchover timing of the switching elements S1 to S10 and an operation state of the S/H circuit 20 are shown in FIG. 3. As shown in FIG. 3, the timing signal generator 19 controls switching elements S1 to S8 to switch over in synchronization with a rising edge of the carrier wave Vs. Accordingly, the charge amplifier 13 is switched over between two coupling states (a first detecting state and a second detecting state) in every period of the carrier wave Vs.

The timing signal generator 19 outputs timing signals to turn off the switching elements S1, S2, S6 and S8 and turn on the switching elements S3, S4, S5 and S7 in the first detecting state. Accordingly, the fixed electrodes of the detection capacitance elements Cd1 and Cd3 are coupled in common, and are coupled to the inverting input terminal of the operational amplifier OP1. The fixed electrodes of the detection capacitance elements Cd2 and Cd4 are coupled in common, and are coupled to the non-inverting input terminal of the operational amplifier OP1. The integration capacitance element Ci1 is coupled between the inverting input terminal and the non-inverting output terminal of the operational amplifier OP1. The integration capacitance element Ci3 is coupled between the non-inverting input terminal and the inverting output terminal of the operational amplifier OP1. That is, the integration capacitance element Ci1 and Ci3 work as feedback capacitances of the operational amplifier OP1. The switching elements S1 to S8 shown in FIG. 1 are set to work in the first detecting state.

The timing signal generator 19 outputs timing signals to turn on the switching elements S1, S2, S6 and S8 and turn off the switching elements S3, S4, S5 and S7 in the second detecting state (a switchover state of switching elements opposite to the switchover state shown in FIG. 1). Accordingly, the fixed electrodes of the detection capacitance elements Cd1 and Cd4 are coupled in common, and are coupled to the inverting input terminal of the operational amplifier OP1. The fixed electrodes of the detection capacitance elements Cd2 and Cd3 are coupled in common, and are coupled to the non-inverting input terminal of the operational amplifier OP1. The integration capacitance element Ci2 is coupled between the inverting input terminal and the non-inverting output terminal of the operational amplifier OP1. The integration capacitance element Ci4 is coupled between the non-inverting input terminal and the inverting output terminal of the operational amplifier OP1. That is, the integration capacitance elements Ci2 and Ci4 work as the feedback capacitances of the operational amplifier OP1.

Figure 3:
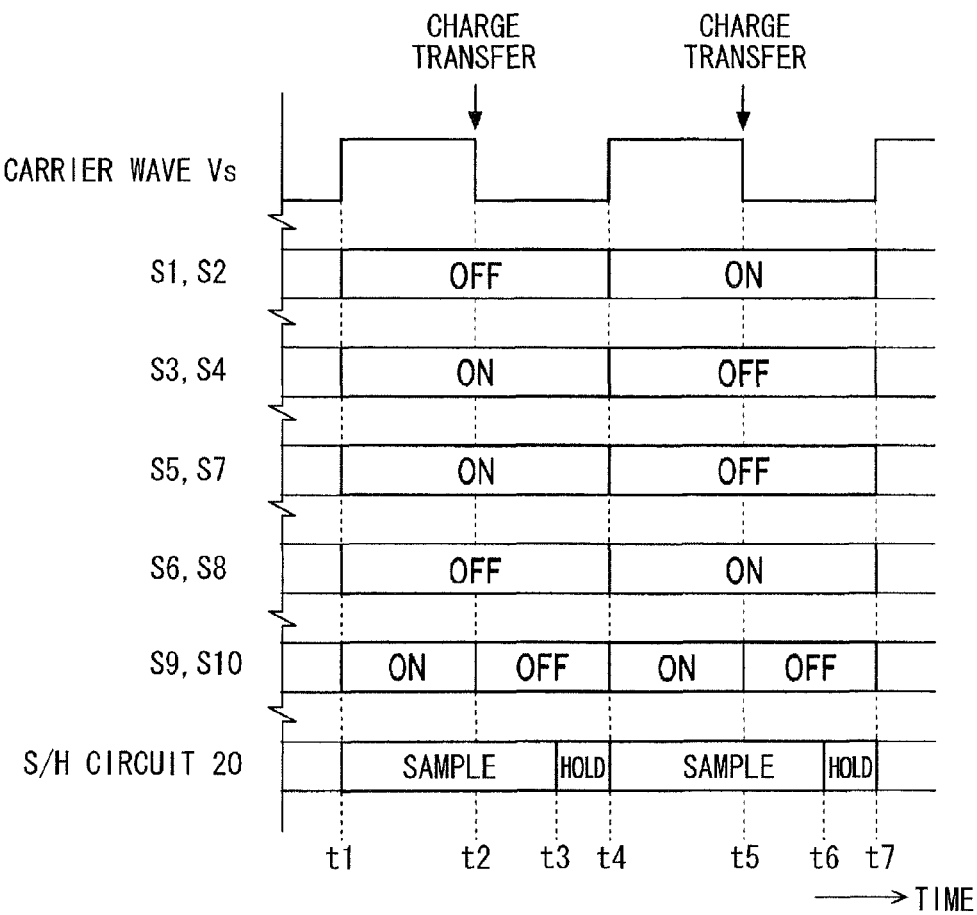
FIG. 3 is a diagram showing a waveform of a carrier wave, switchover states of switching elements, and an operating state of an S/H circuit in the acceleration and angular velocity detection device according to the first embodiment.

As shown in FIG. 3, the timing signal generator 19 turn on the switching elements S9 and S10 in synchronization with the rising edge of the carrier wave Vs. That is, the timing signal generator 19 turns on the switching elements S9 and S10 when the charge amplifier 13 switches over from the first detecting state to the second detecting state or from the second detecting state to the first detecting state. Accordingly, the integration capacitance elements working as the feedback capacitances are short-circuited, and the charge is reset. As shown in FIG. 3, the timing signal generator 19 turns off the switching elements S9 and S10 in synchronization with a falling edge of the carrier wave Vs. Accordingly, the charge is transferred to the integration capacitance elements.

The S/H circuit 20 samples the output signal of the charge amplifier 13 with a predetermined timing and holds the sampled value for a predetermined period of time, then outputs the sampled value to a subsequent circuit (not shown) such as an amplifier circuit, an analogue to digital (A/D) converting circuit or a controlling circuit. As shown in FIG. 3, the S/H circuit 20 samples the output signal of the charge amplifier 13 in synchronization with the rising edge of the carrier wave Vs. A sampling state of the S/H circuit 20 lasts until a point, which is between the next falling edge and the next rising edge of the carrier wave Vs. After the sampling state, the S/H circuit 20 holds the sampled value until the next rising edge of the carrier wave Vs.

The operation of the acceleration and angular velocity detection device 1 according to the present embodiment will be described below.

As shown in FIG. 3, the charge amplifier 13 works in the first detecting state from a point t1 to a point t4, and works in the second detecting state from the point t4 to a point t7. In the first detecting state, capacitances of the oscillation capacitance elements Cd1 and Cd3 are summed together and added to the inverting input terminal of the operational amplifier OP1, and capacitances of the oscillation capacitance elements Cd2 and Cd4 are summed together and added to the non-inverting input terminal of the operational amplifier OP1. In the second detecting state, capacitances of the oscillation capacitance elements Cd1 and Cd4 are summed together and added to the inverting input terminal of the operational amplifier OP1, and capacitances of the oscillation capacitance elements Cd2 and Cd3 are summed together and added to the non-inverting input terminal of the operational amplifier OP1.

In the detection capacitance elements Cd1 to Cd4, the capacitance changes in associated with the acceleration in the y-axis direction and the angular velocity of the rotation around the z-axis are shown by following formulas (1) to (4). The amounts of the capacitance changes in the detection capacitance elements Cd1 to Cd4 are defined as $\Delta Cd1$ to $\Delta Cd4$, respectively.

$$\Delta Cd1 = +\Delta C1 + \Delta C2 \quad (1)$$

$$\Delta Cd2 = -\Delta C1 - \Delta C2 \quad (2)$$

$$\Delta Cd3 = +\Delta C1 - \Delta C2 \quad (3)$$

$$\Delta Cd2 = -\Delta C1 + \Delta C2 \quad (4)$$

In the first detecting state, a capacitance shown by a formula (5) is applied to the inverting input terminal of the operational amplifier OP1.

$$(C + \Delta Cd1) + (C + \Delta Cd3) = 2 \cdot C + 2 \cdot \Delta C1 \quad (5)$$

That is, in the first detecting state, a sum of the capacitances (initial capacitance) of two detection capacitance elements (Cd1 and Cd3) and twice of the oscillation component "$\Delta C1$" associated with the acceleration are added and applied to the inverting input terminal of the operational amplifier OP1. In this case, the oscillation components ($+\Delta C2$, $-\Delta C2$) associated with the angular velocity are compensated by each other.

Additionally, in the first detecting state, a capacitance shown by a formula (6) is applied to the non-inverting input terminal of the operational amplifier OP1.

$$(C + \Delta Cd2) + (C + \Delta Cd4) = 2 \cdot C - 2 \cdot \Delta C1 \quad (6)$$

That is, in the first detecting state, a difference calculated by subtracting twice of the oscillation component "$\Delta C1$" associated with the acceleration from the sum of the capacitances (initial capacitance) of two detection capacitance elements (Cd2 and Cd4) is applied to the non-inverting input terminal of the operational amplifier OP1. In this case, the oscillation components (−ΔC2, +ΔC2) associated with the angular velocity are compensated by each other.

As described above, in the first detecting state, the initial capacitances are compensated by the operational amplifier OP1, and acceleration-associated oscillation components, which are generated by the oscillation elements 5 and 6 in the y-axis direction, are transferred to the integration capacitance elements C11 and Ci3 that work as the feedback capacitances. However, in the first detecting state, during a time period from the point t1 to a point t2, since the switching elements S9 and S10 are set to on-state, the above-described capacitance changes are not transferred to the integration capacitance elements Ci1 and Ci3. At the point t2, when the switching elements S9 and S10 are turned off, the capacitance changes are transferred to the integration capacitance elements Ci1 and Ci3.

The charge amplifier 13 outputs the voltage signal depending on the above-described capacitance change during a time period from the point t2 to the point t4. The S/H circuit 20 samples the output signal of the charge amplifier 13 during a time period from the point t1 to a point t3, and holds the sampled signal for a time period from the point t3 to the point t4. Thus, the signal depending on the acceleration-associated oscillation component generated by the oscillation elements 5 and 6 is output to the subsequent circuit by the S/H circuit 20 in the first detecting state. Further, the acceleration in the y-axis direction is detected by the subsequent circuit based on the output signal of the S/H circuit 20.

In the second detecting state, a capacitance shown by a formula (7) is applied to the inverting input terminal of the operational amplifier OP1.

$$(C+\Delta Cd1)+(C+\Delta Cd4)=2\cdot C+2\cdot \Delta C2 \quad (7)$$

That is, in the second detecting state, a sum of the capacitances (initial capacitance) of two detection capacitance elements (Cd1 and Cd4) and twice of the oscillation component "ΔC2" associated with the angular velocity are added and applied to the inverting input terminal of the operational amplifier OP1. In this case, the oscillation components (+ΔC1, −ΔC1) associated with the acceleration are compensated by each other.

Additionally, in the second detecting state, a capacitance shown by a formula (8) is applied to the non-inverting input terminal of the operational amplifier OP1.

$$(C+\Delta Cd2)+(C+\Delta Cd3)=2\cdot C\cdot 2-\Delta C2 \quad (8)$$

That is, in the second detecting state, a difference calculated by subtracting twice of the oscillation component "ΔC2" associated with the angular velocity from the sum of the capacitances (initial capacitance) of two detection capacitance elements (Cd2 and Cd3) is applied to the non-inverting input terminal of the operational amplifier OP1. In this case, the oscillation components (−ΔC1, +ΔC1) associated with the acceleration are compensated by each other.

As described above, in the second detecting state, the initial capacitances are compensated by the operational amplifier OP1, and angular velocity-associated oscillation components, which are generated by the oscillation elements 5 and 6 in the y-axis direction, are transferred to the integration capacitance elements Ci2 and Ci4 that work as the feedback capacitances. However, in the second detecting state, during a time period from the point t4 to a point t5, since the switching elements S9 and S10 are set to on-state, the above-described capacitance changes are not transferred to the integration capacitance elements Ci2 and Ci4. At the point t5, when the switching elements S9 and S10 are turned off, the capacitance changes are transferred to the integration capacitance elements Ci2 and Ci4.

The charge amplifier 13 outputs the voltage signal depending on the above-described capacitance change during a time period from the point t5 to the point t7. The S/H circuit 20 samples the output signal of the charge amplifier 13 during a time period from the point t4 to a point t6, and holds the sampled signal for a time period from the point t6 to the point t7. Thus, the signal depending on the angular velocity-associated oscillation components generated by the oscillation elements 5 and 6 is output to the subsequent circuit by the S/H circuit 20 in the second detecting state. Further, the angular velocity of the rotation around the z-axis is detected by the subsequent circuit based on the output signal of the S/H circuit 20.

As described above, the acceleration and angular velocity detection device 1 according to the present embodiment provides following advantages.

In the first detecting state, angular velocity-associated capacitance changes of the detection capacitance elements Cd1 to Cd4 are compensated by each other, and the initial capacitances of the detection capacitance elements Cd1 to Cd4 and acceleration-associated capacitance changes of the detection capacitance elements Cd1 to Cd4 are input to the charge amplifier 13. In the charge amplifier 13, the initial capacitances are compensated by the operational amplifier OP1, and voltage signal depending on the capacitance change of the detection capacitance elements Cd1 to Cd4 associated with the angular velocity is output from the charge amplifier 13. By this structure, the acceleration applied to the sensor portion 4 in the y-axis direction is detected with a high detection accuracy.

In the second detecting state, acceleration-associated capacitance changes of the detection capacitance elements Cd1 to Cd4 are compensated by each other, and the initial capacitances of the detection capacitance elements Cd1 to Cd4 and angular velocity-associated capacitance changes of the detection capacitance elements Cd1 to Cd4 are input to the charge amplifier 13. In the charge amplifier 13, the initial capacitances are compensated by the operational amplifier OP1, and voltage signal depending on capacitance change of the detection capacitance elements Cd1 to Cd4 associated with the acceleration is output from the charge amplifier 13. By this structure, the angular velocity of the rotation around the z-axis applied to the sensor portion 4 is detected with the high detection accuracy.

In the detection capacitance elements Cd1 to Cd4, the capacitance changes (ΔC1) associated with the acceleration are relatively larger, for example larger by single-digit or double-digit, than the capacitance changes (ΔC2) associated with the angular velocity. Therefore, when a gain (amplification factor) of the C/V converting circuit formed by the charge amplifier 13 is set to a fixed value, there will be a problem. When the gain is set according to the acceleration, a signal to noise (S/N) ratio of the output signal during the angular velocity detection is decreased. In contrast, when the gain is set according to the angular velocity, the output signal during the acceleration detection may be saturated.

To this problem, in the present embodiment, the amplification factor of the charge amplifier 13 in the first detecting state may be set according to the capacitances of the integration capacitance elements Ci1 and Ci3 that work as the feedback capacitances. That is, a detection sensitivity of the acceleration may be set according to the capacitances of the integration capacitance elements C11 and Ci3 that work as the feedback capacitances. The integration capacitance elements Ci1 and Ci3 do not work as the feedback capacitances in the second detecting state. Accordingly, the detection sensitivity of the acceleration may be adjusted independently of an adjustment of a detection sensitivity of the angular velocity. Therefore, the detection sensitivity of the acceleration in the y-axis direction may be set appropriately without being affected by a detection sensitivity state of the angular velocity of the rotation around the z-axis.

Further, the amplification factor of the charge amplifier 13 in the second detecting state may be set according to the capacitances of the integration capacitance elements Ci2 and Ci4 that work as the feedback capacitances. That is, the detection sensitivity of the angular velocity may be set according to the capacitances of the integration capacitance elements Ci2 and Ci4 that work as the feedback capacitances. The integration capacitance elements Ci2 and Ci4 do not work as the feedback capacitances in the first detecting state. Accordingly, the detection sensitivity of the angular velocity may be adjusted independently of an adjustment of the detection sensitivity of the acceleration. Therefore, the detection sensitivity of the angular velocity of the rotation around the z-axis may be set appropriately without being affected by a detection sensitivity state of the acceleration in the y-axis direction.

The switching elements S1 to S4, which form the input switching portion 16, and the switching elements S5 to S7, which form the integration capacitance element switching portion 17 may generate switching noise, which is generated when the switching elements switch over. The switching noise may adversely affect the output of the charge amplifier 13. That is, in a case where extra charge is transferred (injected) to the integration capacitance elements Ci1 to Ci4 that work as the feedback capacitances caused by a charge injection and a clock feed-through, which are generated when the switching elements switch over, a noise component is superimposed to the output signal of the charge amplifier 13. In this case, the detection sensitivity of the acceleration or the angular velocity may decrease. Regarding this problem, in the present embodiment, the switching elements S9 and S10 are turned on after switching over between the first detecting state and the second detecting state. Therefore, the integration capacitance elements Ci1 to Ci4 that work as feedback capacitances are short-circuited. Then the switching elements S9 and S10 are turned off and the integration capacitance elements C11 to Ci4 are charged. In this way, in a case where extra charge is injected to the integration capacitance elements Ci1 to Ci4 with the switching over of the switching elements S1 to S8, the extra charge is discharged from the integration capacitance elements Ci1 to Ci4 and then the integration capacitance elements Ci1 to Ci4 are charged. Therefore, the C/V converting by the charge amplifier 13 may be performed with adverse effect of the switching noise, which is generated by the switching elements S1 to S8, is eliminated as much as possible. Accordingly, By this structure, the acceleration or the angular velocity is detected with a high detection accuracy without being affected by the above-described switching noise.

In the present embodiment, the charge amplifier 13, which is formed of an operational amplifier OP1 as a main part and is formed in fully differential structure, is used and the input to the single operational amplifier OP1 is switched over by time division controlled by the input switching portion 16 to separately detect the acceleration in the y-axis direction and the angular velocity of the rotation around the z-axis. By this structure, a circuit area may be decreased substantially compared with a structure in which a plurality of operational amplifiers is used to detect the acceleration and the angular velocity. Additionally, a common-mode noise may be decreased by using the charge amplifier 13 having the fully differential structure compared with a structure in which a single-end input charge amplifier is used. Therefore, detection accuracies of the acceleration and the angular velocity are increased.

Each of the switching elements S1 to S4, which form the input switching portion 16, and the switching elements S5 to S7, which form the integration capacitance element switching portion 17, is formed of the CMOS analogue switch 15. Generally, a circuit area needed to form the analogue switch 15 is substantially smaller than a circuit area needed to form an operational amplifier. Therefore, when the input switching portion 16 and the integration capacitance element switching portion 17 are added to the circuit, the circuit area decreasing effect is not affected by the switching portions.

Second Embodiment

Figure 4:
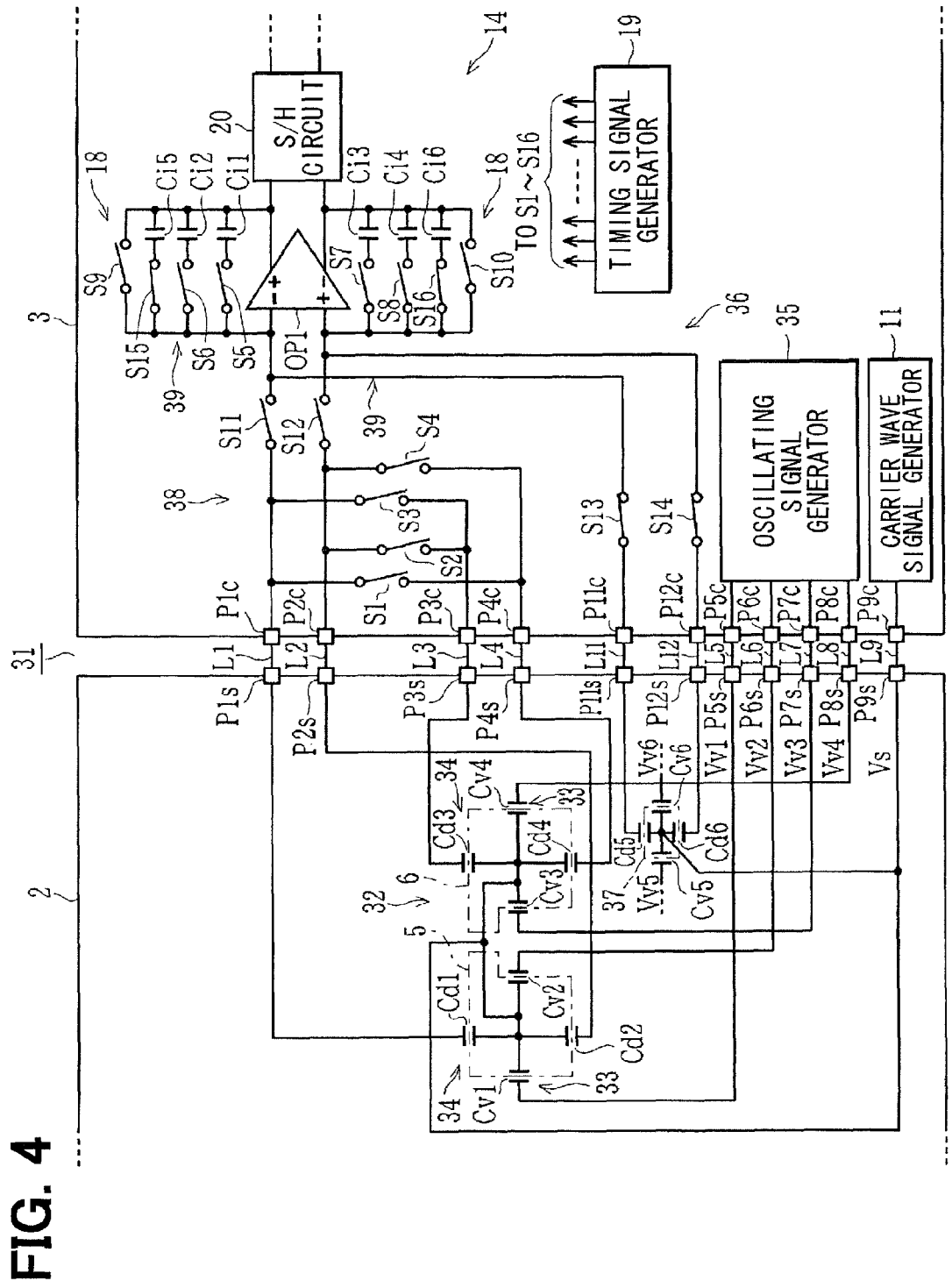
FIG. 4 is a block diagram of an acceleration and angular velocity detection device according to a second embodiment of the present disclosure.

A second embodiment of the present disclosure will be described with reference to FIG. 4 and FIG. 5. In FIG. 4, the same reference number is added to the same or similar parts of the first embodiment. As shown in FIG. 4, an acceleration and angular velocity detection device 31 according to the second embodiment has a movable part 32, an oscillating part 33 and an outputting part 34 instead of the movable part 7, the oscillating part 8 and the outputting part 9 in the first embodiment. Further, the acceleration and angular velocity detection device 31 has an oscillating signal generator 35 instead of the oscillating signal generator 12 in the first embodiment, and has a charge amplifier 36 instead of the charge amplifier 13 in the first embodiment.

The movable part 32 has an oscillation element 37 that is movable in the x-axis direction and the z-axis direction. The movable part 32 can work as a third oscillation element. The oscillating part 33 has two oscillation capacitance elements Cv5 and Cv6. The oscillating part 33 can work as an oscillating portion. The oscillation capacitance elements Cv5 and Cv6 are provided to generate an electrostatic force so that the oscillation element 37 oscillates in the x-axis direction. A first part of the oscillation element 37 provides an electrode of the oscillation capacitance element Cv5 and a second part of the oscillation element 37 provides an electrode of the oscillation capacitance element Cv6. The two electrodes provided by the oscillation element 37 are movable with the oscillation element 37. Each of the movable electrodes of the oscillation capacitance elements Cv5 and Cv6 is coupled in common. The carrier wave Vs, which is transferred from the circuit chip 3, is applied to each of the movable electrodes of the oscillation capacitance elements Cv5 and Cv6 via the terminal P9s and the connecting line L9. The other electrode of each of the oscillation capacitance elements Cv5 and Cv6 is a fixed electrode. Oscillating signals Vv5 and Vv6, which are transferred from the circuit chip 3, are applied to the fixed electrodes of the oscillation capacitance elements Cv5 and Cv6 (not shown).

The outputting part 34 has a pair of detection capacitance elements Cd5 and Cd6. The detection capacitance element Cd5 can work as a fifth detection capacitance element and the detection capacitance element Cd6 can work as a sixth detection capacitance element. Capacitances of the detection capacitance elements Cd5 and Cd6 change in a complementary way in accordance with a displacement of the oscillation element 37 in the z-axis direction. The detection capacitance elements Cd5 and Cd6 have a same initial value (C) in initial states (a state before the capacitances of the detection capacitance elements change in accordance with the displacement of the oscillation element 37). A third part of the oscillation element 37 provides an electrode of the detection capacitance element Cd5 and a fourth part of the oscillation element 37 provides an electrode of the detection capacitance element Cd6. The two electrodes provided by the oscillation element 37 are movable with the oscillation element 37. Each of the movable electrodes of the detection capacitance elements Cd5 and Cd6 is coupled in common. The carrier wave Vs, which is transferred from the circuit chip 3, is applied to each of the movable electrodes of the detection capacitance elements Cd5 and Cd6 via the terminal P9s and the connecting line L9. The other electrode of each of the detection capacitance elements Cd5 and Cd6 is a fixed electrode. The fixed electrodes of the detection capacitance elements Cd5 and Cd6 are respectively coupled to the terminals P11s and P12s. The terminals P11s and P12s of the sensor chip 2 are respectively coupled to the terminals P11c and P12c of the circuit chip 3 via respective connecting lines L11 and L12.

The oscillation element 37 oscillates in the x-axis direction constantly when the oscillating signals Vv5 and Vv6, which are transferred from the circuit chip 3, are appropriately controlled. In this structure, when a rotation around the y-axis is applied to the sensor portion 4, a Coriolis force depending on an angular velocity of the rotation is applied to the movable part 32 and generates an oscillation in the z-axis direction. In this case, the oscillation element 37 oscillates in the z-axis direction. An oscillating state of the oscillation element 37 is shown as capacitance changes in the detection capacitance elements Cd5 and Cd6 formed in the outputting part 34.

The oscillating signal generator 35 generates the oscillating signals Vv5 and Vv6. The oscillating signals Vv5 and Vv6 are supplied to the oscillating part 33 of the sensor chip 2 via the terminals and the connecting lines, which are not shown. The oscillation capacitance elements Cv5 and Cv6 formed in the oscillating part 33 receive the oscillating signals Vv5 and Vv6 via the fixed electrodes, and generate the electrostatic force, which move the oscillation element 37 in the x-axis direction. The oscillating signal generator 35 receive an x-axis oscillating signal (not shown), which shows an x-axis oscillation component of the oscillation element 37, from the sensor chip 2. The oscillating signal generator 35 controls a generation of oscillating signals Vv5 and Vv6 in a feedback control manner based on the x-axis oscillating signal so that the oscillation element 37 oscillates with a predetermined amplitude and a predetermined frequency in the x-axis direction.

Compared with the charge amplifier 13 in the first embodiment, the charge amplifier 36 further includes switching elements S11 to S16 and integration capacitance elements Ci5 and Ci6. The integration capacitance elements Ci5 and Ci6 are included in a third integration capacitance group. In the present embodiment, the switching elements S1 to S4 and switching elements S11 and S14 form an input switching portion 38, and the switching elements S5 to S8 and switching elements S15 and S16 form an integration capacitance element switching portion 39.

The terminal P1c is coupled to the inverting input terminal of the operational amplifier OP1 via the switching element S11, and the terminal P1c is coupled to the non-inverting input terminal of the operational amplifier OP1 via the switching element S12. The terminal P11c is coupled to the inverting input terminal of the operational amplifier OP1 via the switching element S13, and the terminal P12c is coupled to the non-inverting input terminal of the operational amplifier OP1 via the switching element S14.

The switching element S15 and the integration capacitance element Ci5 coupled in series are coupled between the inverting input terminal and the non-inverting output terminal of the operational amplifier OP1. The switching element S16 and the integration capacitance element Ci6 coupled in series are coupled between the non-inverting input terminal and the inverting output terminal of the operational amplifier OP1. The capacitance of the integration capacitance element Ci5 is equal to the capacitance of the integration capacitance element Ci6.

The detecting part 14 detects an angular velocity of the rotation around the y-axis, which are externally-applied to the sensor portion 4, based on the output signal of the charge amplifier 36. The timing signal generator 19 formed in the detecting part 14 generates timing signals in synchronization with the carrier wave Vs, and controls the switching elements S1 to S16 to switch over based on the timing signals. As shown in FIG. 5, the switching elements S1 to S8 and S11 to S16 are controlled to switch over in synchronization with the rising edge of the carrier wave Vs by the timing signal generator 19. Accordingly, the charge amplifier 36 is switched over between three coupling states (the first detecting state, the second detecting state and a third detecting state) in every period of the carrier wave Vs.

In the first detecting state and the second detecting state, the timing signal generator 19 outputs timing signals to turn on the switching elements S11 and S12, and turn off the switching elements S13 to S16, and control the switching elements S1 to S8 in the similar way with the first embodiment. In the third detecting state, the timing signal generator 19 outputs timing signals to turn off the switching elements S1 to S8, S11 and S12, and turn on the switching elements S13 to S16. Alternatively, in the third detecting state, the switching elements S1 to S4 may be turned on. Therefore, in FIG. 5, the switching elements S1 to S4 are set to "indefinite" values in the third detecting state (from the point t7 to a point t10).

Accordingly, the fixed electrodes of the detection capacitance elements Cd5 is coupled to the inverting input terminal of the operational amplifier OP1. The fixed electrode of the detection capacitance elements Cd6 is coupled to the non-inverting input terminal of the operational amplifier OP1. The integration capacitance element Ci5 is coupled between the inverting input terminal and the non-inverting output terminal of the operational amplifier OP1. The integration capacitance element Ci6 is coupled between the non-inverting input terminal and the inverting output terminal of the operational amplifier OP1. That is, the integration capacitance elements Ci5 and Ci6 work as feedback capacitances of the operational amplifier OP1. The switching elements S1 to S16 shown in FIG. 4 are set to work in the third detecting state.

Figure 5:
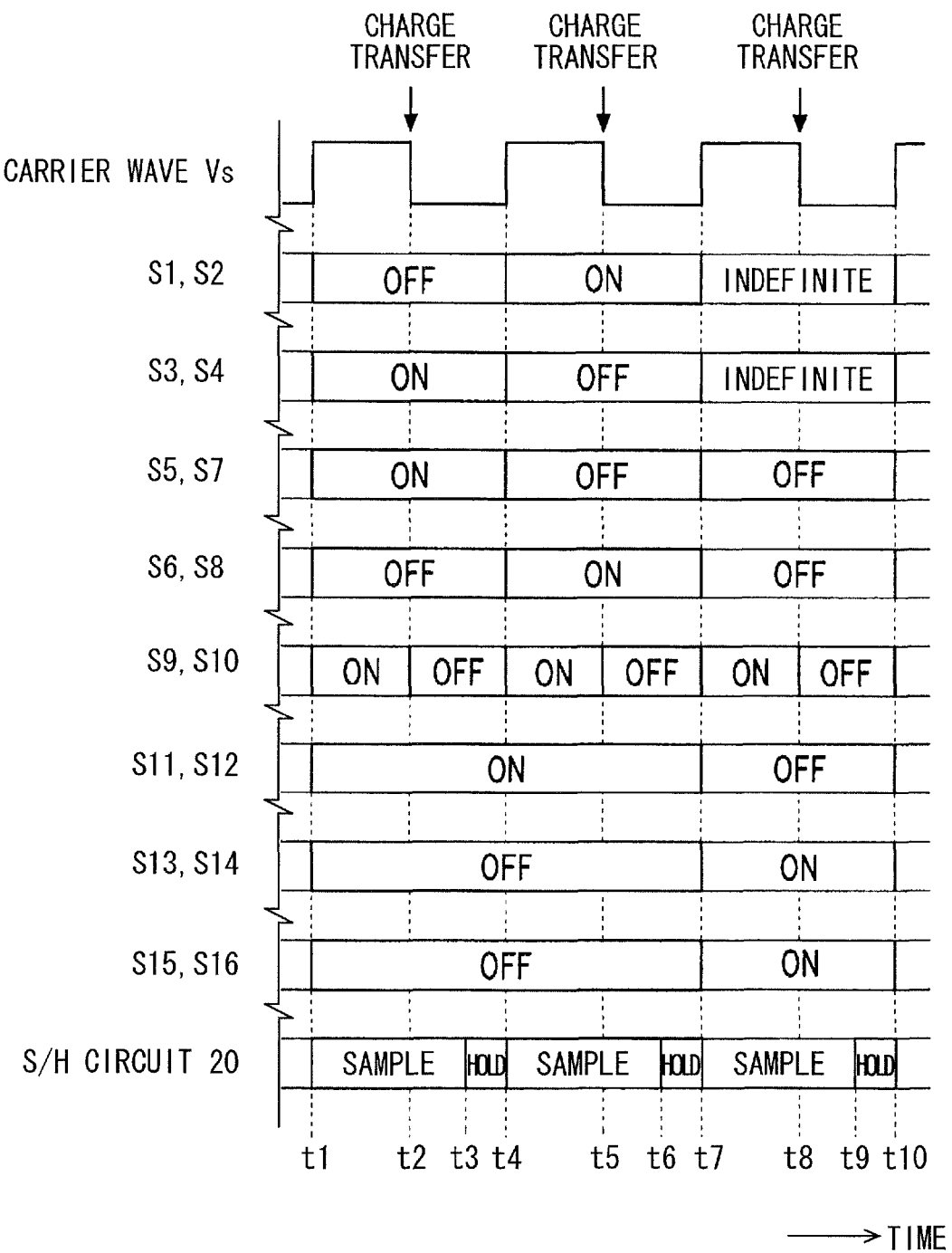
FIG. 5 is a diagram showing a waveform of a carrier wave, switchover states of switching elements, and an operating state of an S/H circuit in the acceleration and angular velocity detection device according to the second embodiment.

As shown in FIG. 5, the timing signal generator 19 turns on the switching elements S9 and S10 when the charge amplifier 36 switches over from the second detecting state to the third detecting state or from the third detecting state to the first detecting state.

The operation of the acceleration and angular velocity detection device 31 according to the present embodiment will be described below.

As shown in FIG. 5, the charge amplifier 36 works in the first detecting state from a point t7 to the point t10. In the third detecting state, capacitance of oscillation capacitance elements Cd5 is added to the inverting input terminal of the operational amplifier OP1, and capacitance of oscillation capacitance elements Cd6 is added to the non-inverting input terminal of the operational amplifier OP1. That is, in the third detecting state, a sum of the capacitance (initial capacitance) of the detection capacitance element Cd5 and a capacitance change associated with the angular velocity of the rotation around the y-axis direction is applied to the inverting input terminal of the operational amplifier OP1, and a sum of the capacitance (initial capacitance) of the detection capacitance element Cd6 and the capacitance change associated with the angular velocity of the rotation around the y-axis direction is applied to the non-inverting input terminal of the operational amplifier OP1.

In the third detecting state, the initial capacitances are compensated by the operational amplifier OP1 and an angular velocity-associated oscillation component, which is generated by the oscillation element 37 in the z-axis direction, is transferred to the integration capacitance elements Ci5 and Ci6 that work as the feedback capacitances. However, in the third detecting state, during a time period from the point t7 to a point t8, since the switching elements S9 and S10 are set to on-state, the above-described capacitance change is not transferred to the integration capacitance elements Ci5 and Ci6. At the point t8, when the switching elements S9 and S10 are turned off, the capacitance change is transferred to the integration capacitance elements Ci5 and Ci6.

The charge amplifier 36 outputs the voltage signal depending on the above-described capacitance change during a time period from the point t8 to the point t10. The S/H circuit 20 samples the output signal of the charge amplifier 36 during a time period from the point t7 to the point t9, and holds the sampled signal for a time period from the point t9 to the point t10. Thus, the signal depending on the angular velocity-associated oscillation component generated by the oscillation element 37 is output to the subsequent circuit by the S/H circuit 20 in the third detecting state. Further, the angular velocity of the rotation around the y-axis is detected by the subsequent circuit based on the output signal of the S/H circuit 20.

As described above, the acceleration and angular velocity detection device according to the present embodiment provides following advantages.

In the third detecting state, the initial capacitances of the detection capacitance elements Cd5 and Cd6 and angular velocity-associated capacitance changes of the detection capacitance elements Cd5 and Cd6 are input to the charge amplifier 36. In the charge amplifier 36, the initial capacitances are compensated by the operational amplifier OP1, and the voltage depending on the capacitance change of the detection capacitance elements Cd5 to Cd6 associated with the angular velocity is output from the charge amplifier 36. By this structure, the angular velocity of the rotation around the y-axis applied to the sensor portion 4 is detected with a high detection accuracy.

In the third detecting state, an amplification factor of the charge amplifier 36 may be set according to the capacitances of the integration capacitance elements Ci5 and Ci6 that work as the feedback capacitances. That is, in the third detecting state, a detection sensitivity of the angular velocity of the rotation around the y-axis may be set according to the capacitances of the integration capacitance elements Ci5 and Ci6 that work as the feedback capacitances. The integration capacitance elements Ci5 and Ci6 do not work as the feedback capacitances in the first detecting state and the second detecting state. Accordingly, the detection sensitivity of the angular velocity of the rotation around the y-axis may be adjusted independently of an adjustment of a detection sensitivity of the acceleration in the y-axis direction and an adjustment of a detection sensitivity of the angular velocity of a rotation around the z-axis or other axes. Therefore, the detection sensitivity of the angular velocity of the rotation around the y-axis may be set appropriately without being affected by a detection sensitivity state of the acceleration and other angular velocities.

In the present embodiment, the charge amplifier 36, which is formed of an operational amplifier OP1 as a main part and is formed in fully differential structure, is used and the input to the single operational amplifier OP1 is switched over by time division controlled by the input switching portion 38 to separately detect the acceleration in the y-axis direction, the angular velocity of the rotation around the z-axis and the angular velocity of the rotation around the y-axis. By this structure, a circuit area may be decreased substantially compared with a structure in which a plurality of operational amplifiers is used to detect the acceleration and two kinds of angular velocities.

Third Embodiment

Figure 6:
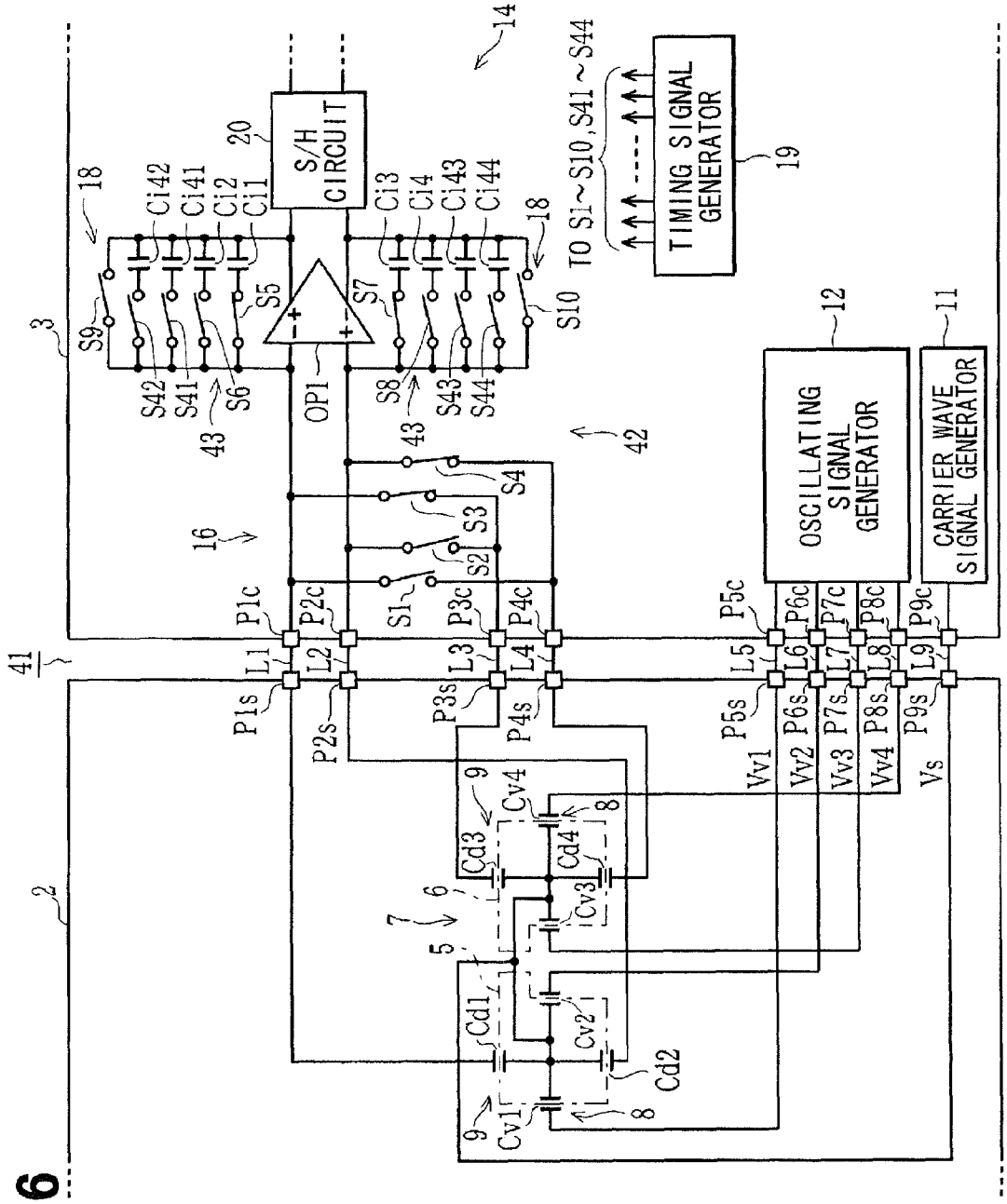
FIG. 6 is a block diagram of an acceleration and angular velocity detection device according to a third embodiment of the present disclosure.

A third embodiment of the present disclosure will be described with reference to FIG. 6 and FIG. 7. In FIG. 6, the same reference number is added to the same or similar parts of the first embodiment. As shown in FIG. 4, an acceleration and angular velocity detection device 41 according to the third embodiment has a charge amplifier 42 instead of the charge amplifier 13 of the acceleration and angular velocity detection device 1 according to the first embodiment.

Compared with the charge amplifier 13 in the first embodiment, the charge amplifier 42 further includes switching elements S41 to S44 and integration capacitance elements Ci41 to Ci44. In the present embodiment, the switching elements S5 to S8 and switching elements S41 to S44 form an integration capacitance element switching portion 43. The switching element S41 and the integration capacitance element Ci41 coupled in series, and the switching element S42 and the integration capacitance element Ci42 coupled in series are coupled in parallel between the inverting input terminal and the non-inverting output terminal of the operational amplifier OP1. The switching element S43 and the integration capacitance element Ci43 coupled in series, and the switching element S44 and the integration capacitance element Ci44 coupled in series are coupled in parallel between the non-inverting input terminal and the inverting output terminal of the operational amplifier OP1.

The integration capacitance elements Ci41 and Ci43 are included in the first integration capacitance group, and have the same capacitance. The integration capacitance elements Ci42 and Ci44 are included in the second integration capacitance group, and have the same capacitance. That is, in the present embodiment, the first integration capacitance group includes integration capacitance elements Ci1, Ci3, Ci41 and Ci43. Additionally, the second integration capacitance group includes integration capacitance elements Ci2, Ci4, Ci42 and Ci44.

Among the integration capacitance elements included in the first integration capacitance group, the capacitance of the integration capacitance elements Ci1 and Ci3 is defined as C11, and the capacitance of the integration capacitance elements Ci41 and Ci43 is defined as C12. The capacitances C11 and C12 satisfy the following relationship shown by a formula (9).

$$C11 < C12 \tag{9}$$

Among the integration capacitance elements, included in the second integration capacitance group, the capacitance of the integration capacitance elements Ci2 and Ci4 is defined as C21, and the capacitance of the integration capacitance elements Ci42 and Ci44 is defined as C22. The capacitances C21 and C22 satisfy the following relationship shown by a formula (10).

$$C21 < C22 \tag{10}$$

In the present embodiment, a carrier wave Vs has a frequency, which is two times higher than that of the carrier wave Vs in the first embodiment. The timing signal generator 19 generates timing signals in synchronization with the carrier wave Vs, and controls the switching element S1 to S10 and switching elements 541 to S44 to switch over based on the timing signals. Similar to the first embodiment, the timing signal generator 19 controls each of the switching elements to switch over with timing signals in synchronization with the rising edge of the carrier wave Vs. However, in the present embodiment, the timing signal generator 19 controls each of the switching elements to switch over differently from the first embodiment.

Figure 7:
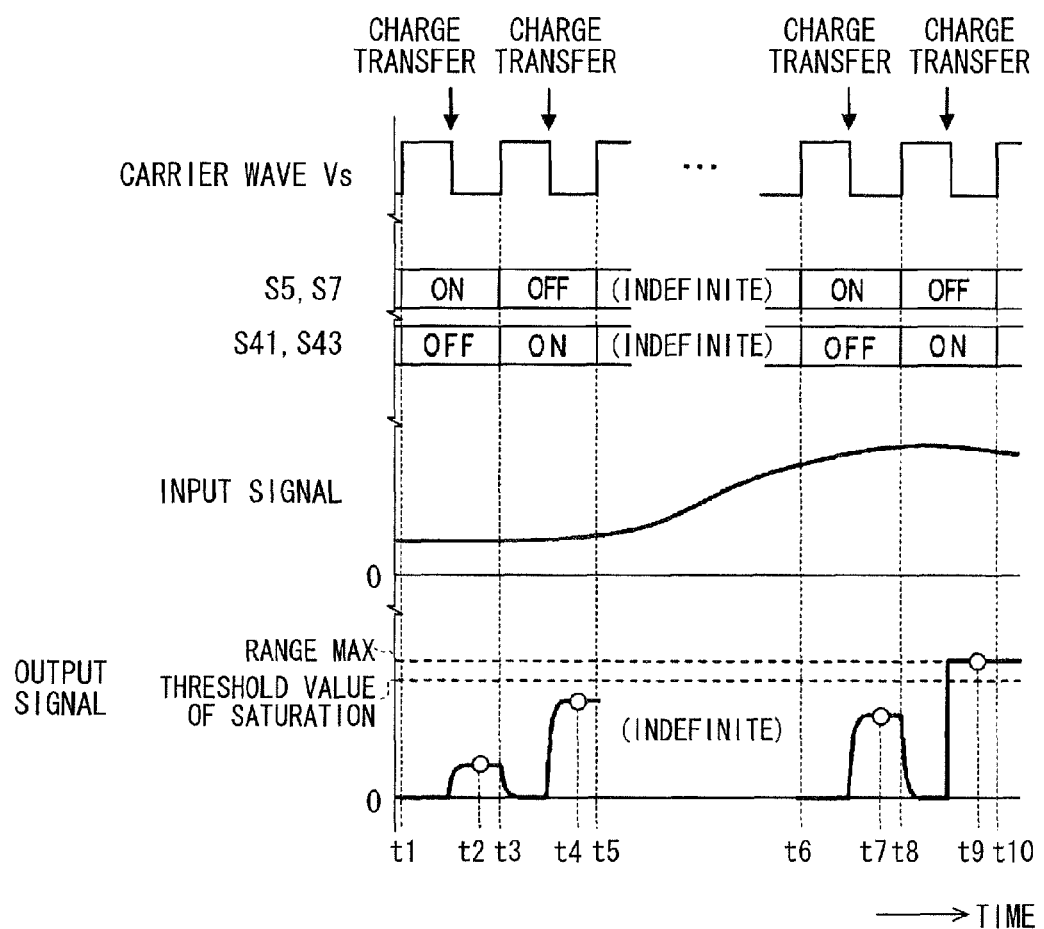
FIG. 7 is a diagram showing a waveform of a carrier wave, switchover states of switching elements, and input/output signals of a charge amplifier.

FIG. 7 shows the carrier wave Vs, switchover timings of the switching elements that form the integration capacitance element switching portion 43 and input/output signals of the charge amplifier 42. In the present embodiment, the charge amplifier 42 is switched over between two coupling states (the first detecting state and the second detecting state) in every two periods of the carrier wave Vs. That is, the charge amplifier 42 is switched over in such a manner that the first detecting state repeats for two times, and then the second detecting state repeats for two times.

By the above-described structure, in the present embodiment, the charge amplifier 42 has two first detecting states (a first time first detecting state and a second time first detecting state) and two second detecting states (a first time second detecting state and a second time second detecting state). The integration capacitance elements that work as the feedback capacitances are different in the first time first detecting state and the second time first detecting state. That is, during the first time first detecting state (from a point t1 to a point t3 in FIG. 7), the switching elements S5 and S7 in the integration capacitance element switching portion 43 are turned on, and the switching elements S6, S8 and S41 to S44 in the integration capacitance element switching portion 43 are turned off. Thus, the integration capacitance elements Ci1 and Ci3, which have relatively small capacitances, work as the feedback capacitances of the operational amplifier OP1 in the first time first detecting state. Additionally, during the second time first detecting state (from the point t3 to a point t5 in FIG. 7), the switching elements S5 to S8, S42 and S44 in the integration capacitance element switching portion 43 are turned off, and the switching elements S41 and S43 in the integration capacitance element switching portion 43 are turned on. Thus, the integration capacitance elements Ci41 and Ci43, which have relatively large capacitances, work as the feedback capacitances of the operational amplifier OP1 in the first time second detecting state and the second time second detecting state.

Further, similar to the first detecting states, in the second detecting states, the integration capacitance element switching portion 43 is controlled to differently set the integration capacitance elements that work as the feedback capacitances in the first time second detecting state and the second time second detecting state.

The operation of the acceleration and angular velocity detection device 41 according to the present embodiment will be described below.

The integration capacitance element switching portion 43 is controlled so that the integration capacitance elements Ci1 and Ci3 work as the feedback capacitances during the first time first detecting state (from the point t1 to the point t3). Thus, a gain of the C/V converting performed by the charge amplifier 42 is decreased to a relatively low value. Accordingly, the charge amplifier 42 outputs a voltage signal that is close to a minimum value within an output voltage range (hereafter referred to as range) of the operational amplifier OP1. Additionally, the integration capacitance element switching portion 43 is controlled so that the integration capacitance elements Ci41 and Ci43 work as the feedback capacitances during the second time first detecting state (from the point t3 to the point t5). Thus, the gain of the C/V converting performed by the charge amplifier 42 is increased to a relatively high value. Accordingly, the charge amplifier 42 outputs a voltage signal that is close to a maximum value within the range of the operational amplifier OP1.

As described above, during the first detecting states, the C/V converting is performed for two times, and the gains of the C/V converting in the two first detecting states are different from each other. As a result, the S/H circuit 20 samples the output signal of the charge amplifier 42 two times, and holds the two values of the output signal at the point t2 and the point t4, and outputs the two values of the output signal to the subsequent circuit. In the subsequent circuit, the two values of the output signal of the S/H circuit 20 are compared with each other, and the subsequent circuit detects the acceleration based on a larger value of the output signal. However, in a case where the value of the output signal of the S/H circuit 20 is larger than a threshold value of saturation, this value is not used, and the other value is used to detect the acceleration. The threshold value of saturation is set smaller than the maximum value of the operational amplifier OP1 range by a predetermined value.

By this structure, in a case where the input signal (capacitance change of the detection capacitance elements depending on the acceleration) to the charge amplifier 42 is relatively small, for example during a time period from the point t1 to the point t5 in FIG. 7, the acceleration is detected based on a C/V converting result (voltage signal) that has a relatively large value. In contrast, in a case where the input signal (capacitance changes in the detection capacitance elements depending on the acceleration) to the charge amplifier 42 is relatively large, for example during a time period from the point t6 to the point t10 in FIG. 7, the output of the operational amplifier OP1 may be saturated when the C/V converting is performed by the relatively high gain. In a case where the acceleration is detected on the saturated output of the operational amplifier OP1, detection accuracy will be decreased substantially. Therefore, in a case where the input signal of the charge amplifier 42 is relatively large, the acceleration is detected based on the C/V converting result that is converted using a relatively low gain of the C/V converting.

By the structure described in the present embodiment, the gain of the C/V converting performed by the charge amplifier 42 is variable in two stages according to a magnitude of the input signal of the charge amplifier 42. That is, the gain of the C/V converting performed by the charge amplifier 42 is variable in two stages according to the acceleration or the angular velocity applied to the sensor portion 4. Accordingly, in a case where the input signal (capacitance changes in the detection capacitance elements) is small, the C/V converting is performed using the high gain of the C/V converting. In contrast, in a case where the input signal is large, the C/V converting is performed using the low gain of the C/V converting. Therefore, the range of the operational amplifier OP1 works effectively regardless of the magnitude of the input signal, and the S/N ratio is increased.

Fourth Embodiment

Figure 8:
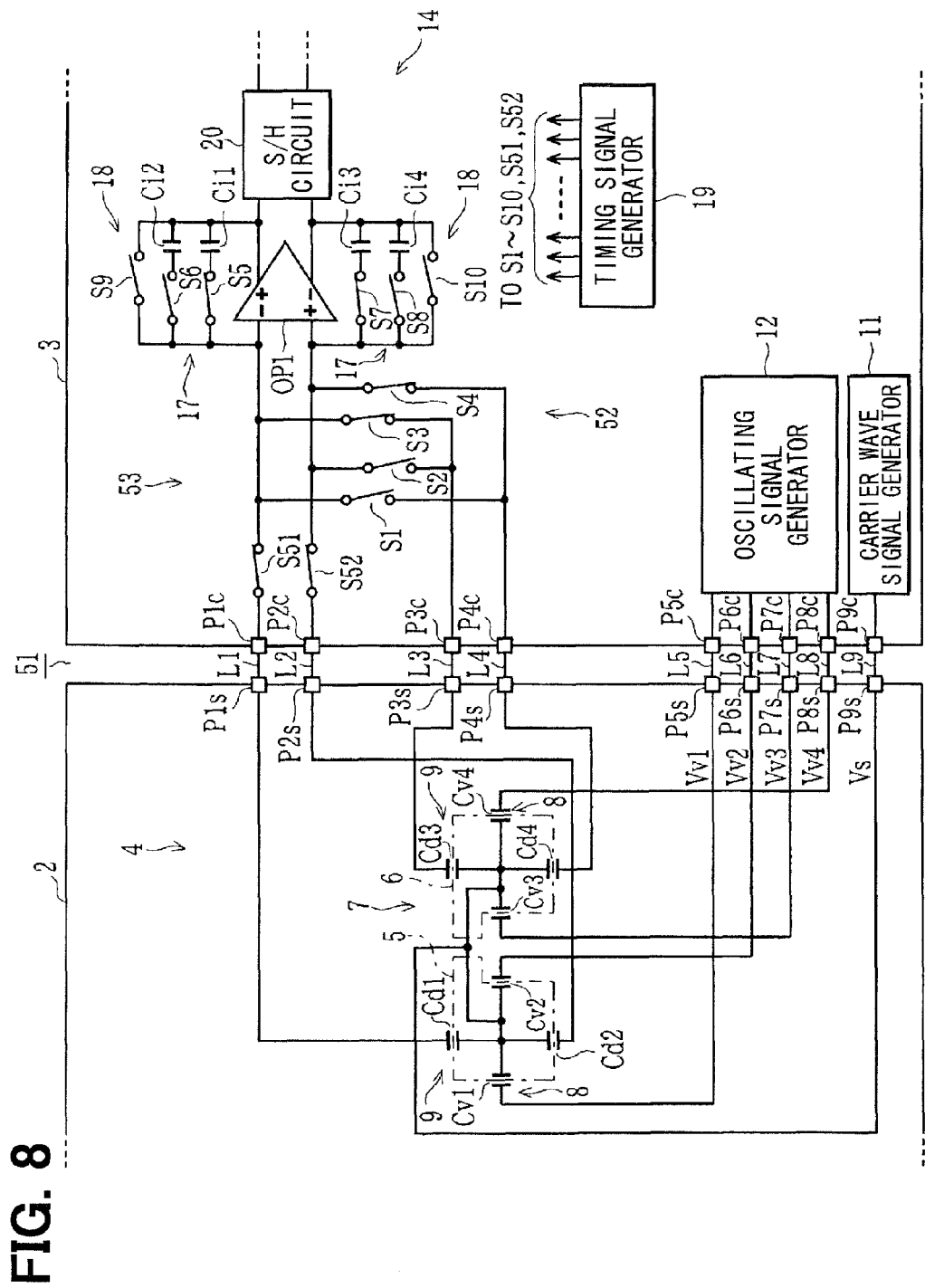
FIG. 8 is a block diagram of an acceleration and angular velocity detection device according to a fourth embodiment of the present disclosure.

A fourth embodiment of the present disclosure will be described with reference to FIG. 8 and FIG. 9. In FIG. 8, the same reference number is added to the same or similar parts of the first embodiment. As shown in FIG. 4, an acceleration and angular velocity detection device 51 according to the fourth embodiment has a charge amplifier 52 instead of the charge amplifier 13 of the acceleration and angular velocity detection device 1 according to the first embodiment.

Compared with the charge amplifier 13 in the first embodiment, the charge amplifier 52 further includes switching elements S51 and S52. In the present embodiment, the switching elements S1 to S4 and switching elements S51 and S52 form an input switching portion 53. The switching element S51 is provided so as to couple and decouple the terminal P1c and the inverting input terminal of the operational amplifier OP1. The switching element S52 is provided so as to couple and decouple the terminal P2c and the non-inverting input terminal of the operational amplifier OP1. The switching element S51 can work as a fifth switching element and the switching element S52 can work as a sixth switching element. In the charge amplifier 52, when the switching elements S51 and S52 are turned on, coupling state of the charge amplifier 52 is similar to the charge amplifier 13 in the first embodiment.

Figure 9:
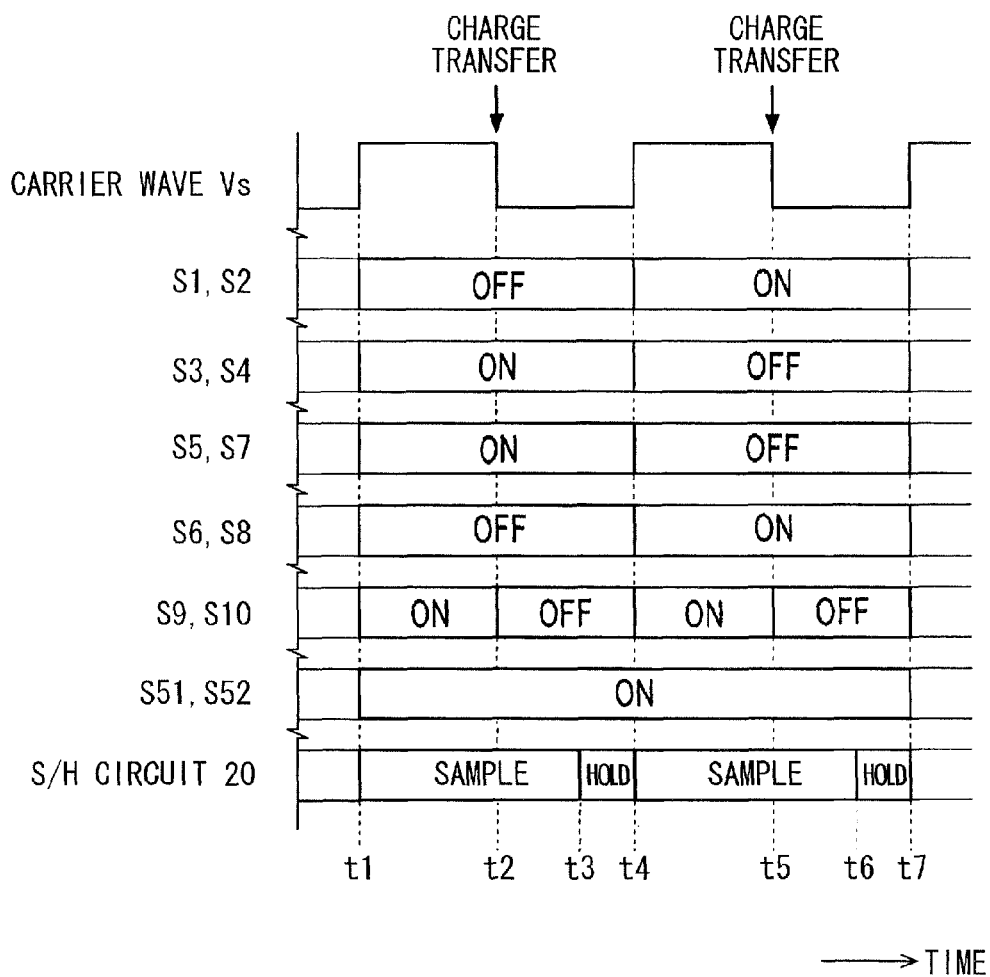
FIG. 9 is a diagram showing a waveform of a carrier wave, switchover states of switching elements, and an operating state of an S/H circuit in the acceleration and angular velocity detection device according to the fourth embodiment.

As shown in FIG. 9, the timing signal generator 19 turns on the switching elements S51 and S52, and then controls the switching elements S1 to S8 to switch over in synchronization with the rising edge of the carrier wave Vs in a similar way to the first embodiment. Accordingly, the charge amplifier 52 is switched over between two coupling states in every period of the carrier wave Vs similar to the first embodiment.

The structure described in the present embodiment operates in a similar way to the first embodiment, and provides similar advantages to the first embodiment. Further, the present embodiment provides following advantages. In this structure, each of the input terminals of the operational amplifier OP1 is coupled to the detection capacitance elements Cd1 to Cd4 via one switching element (any one switching element among the switching elements S1 to S4, S51 and S52) in any one of the detecting states including the first detecting state and the second detecting state. Therefore, impedances of signal transferring paths from each of the detection capacitance elements Cd1 to Cd4 to each of the input terminals of the operational amplifier OP1 are basically similar to each other. Accordingly, in the charge amplifier 52, a C/V converting error, which is caused by a difference in the impedances of the input signal (charge) transferring paths, is decreased. Thus, the detection accuracies of the acceleration and the angular velocity in the present embodiment is increased compared with the first embodiment.

Further, the acceleration and angular velocity detection device 51 may diagnose an abnormal state of the oscillation elements 5 and 6 as described below. In a first diagnosis state, the timing signal generator 19 turns off the switching elements S1 to S4 in the input switching portion 53, and turns on the switching elements S51 and S52 in the input switching portion 53. The integration capacitance element switching portion 17 may be controlled in a state in which any one of the integration capacitance elements works as the feedback capacitance.

In the first diagnosis state, the fixed electrode of the detection capacitance element Cd1 is coupled to the inverting input terminal of the operational amplifier OP1, and the fixed electrode of the detection capacitance element Cd1 is coupled to the non-inverting input terminal of the operational amplifier OP1. That is, the oscillation component generated by the displacement of the oscillation element 5 in the y-axis direction is input to the charge amplifier 52. The detecting part 14 diagnoses an abnormal state of the oscillation element 5 based on the output signal of the charge amplifier 52 in the first diagnosis state. For example, in a case where the charge amplifier 52 does not output signal (the voltage of the output signal is close to zero) when an acceleration in the y-axis direction is applied to the oscillation element 5 or an angular velocity of the rotation around the z-axis direction is applied to the oscillation element 5, the oscillation element 5 or the related structure of the oscillation element 5 is determined to have an abnormality.

In a second diagnosis state, the timing signal generator 19 turns off the switching elements S1, S2, S51 and S52 in the input switching portion 53, and turns on the switching elements S3 and S4 in the input switching portion 53. The integration capacitance element switching portion 17 may be controlled in a state in which any one of the integration capacitance elements works as the feedback capacitance.

In the second diagnosis state, the fixed electrode of the detection capacitance element Cd3 is coupled to the inverting input terminal of the operational amplifier OP1, and the fixed electrode of the detection capacitance element Cd4 is coupled to the non-inverting input terminal of the operational amplifier OP1. That is, the oscillation component generated by the displacement of the oscillation element 6 in the y-axis direction is input to the charge amplifier 52. The detecting part 14 diagnoses an abnormal state of the oscillation element 6 based on the output signal of the charge amplifier 52 in the second diagnosis state. The detecting part 14 may diagnose the abnormal state in the oscillation element 6 in a similar way to a diagnosis method of the abnormal state in the oscillation element 5. As described above, in the present embodiment, the abnormalities in the oscillation elements 5 and 6 are detected by self-diagnosis.

Other Embodiments

Figure 10A:
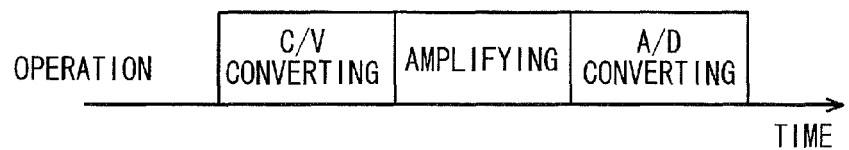
FIG. 10A is a diagram showing operation states of a signal processing circuit and FIG. 10B is a diagram showing the signal processing circuit.
Figure 10B:
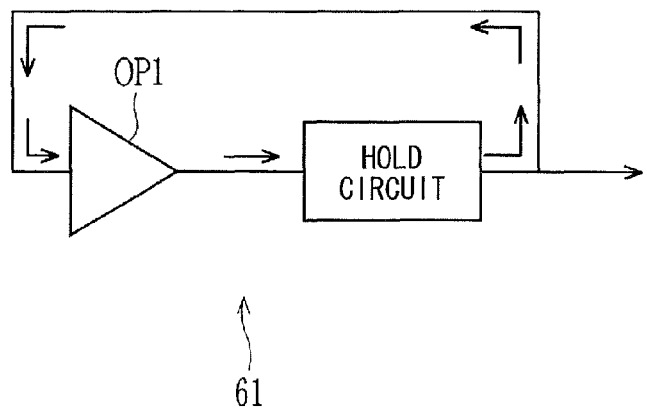

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention The operational amplifier formed in the charge amplifier may operate (amplify and A/D convert) as the detecting part 14. As shown in FIG. 10A and FIG. 10B, a signal processing circuit 61 includes single operational amplifier that forms the charge amplifier, and further includes a plurality of capacitors and switches. By this signal processing circuit 61, signal processing including from the C/V converting to the A/D converting is performed by single operational amplifier, therefore the circuit area is decreased further more.

Figure 2:
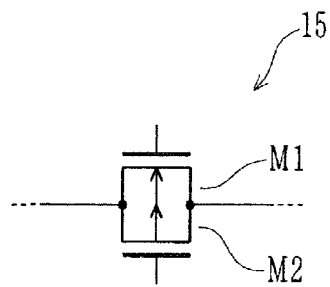
FIG. 2 is an illustrative diagram showing a structure of a switching element.
Figure 11A:
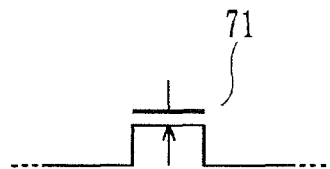
FIG. 11A is a diagram showing a switching element according to a modification.

The switching element may have any structure not limited to the structure shown in FIG. 2. For example, the switching element may have a structure shown in FIG. 11A and FIG. 11B. The switching element shown in FIG. 11A is structured by an n-channel MOS transistor 71. By this structure, the circuit area is decreased compared with the structure in which the CMOS analogue switch is used. However, a voltage band is decreased. Further, the switching element may be formed of a bipolar transistor. In this case, the voltage band is increased to pass through a high power.

Figure 11B:
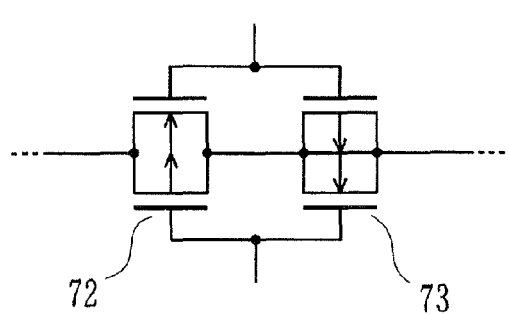
FIG. 11B is a diagram showing a switching element according to another modification.

The switching element shown in FIG. 11B is structured by two CMOS analogue switches. One analogue switch provides a main switch 72, and the other analogue switch provides a dummy switch 73. The dummy switch 73 is coupled in series to the main switch 72, and the two terminals (source and drain) of the dummy switch 73 are short-circuited. That is, the dummy switch is normally-on. Therefore, the switching element shown in FIG. 11B is switched on and off by the main switch 72. The detection accuracy decreases when the switchover of the input switching portion and the integration capacitance element switching portion is performed. By this structure, the decrease in the detection accuracy is restricted as described below.

When the switching portions switch over, charge generated by parasitic capacitance of the MOS transistor that forms the main switch72 may be injected to the integration capacitance elements that work as feedback capacitances. When unwanted charge is injected to the integration capacitance elements, unwanted voltage component is included in the output signal of the charge amplifier and the detection accuracy is increased. However, as shown in FIG. 11B, the injected charge by the MOS transistor formed in the main switch 72 is compensated by the MOS transistor formed in the dummy switch 73, which is coupled to the main switch 72 in series. Therefore, the noise generated by the switchover of the switching portions is inhibited from affecting adversely the detection accuracies, and the high detection accuracies of the acceleration and angular velocity are maintained.

Further, a channel width of the MOS transistor formed in the dummy switch 73 may be set half the width of a channel width of the MOS transistor formed in the main switch 72. By this structure, the unwanted injected charge is compensated completely by the MOS transistor formed in the dummy switch 73.

In the present disclosure, the acceleration and angular velocity detection device, which detects the acceleration and angular velocity by detecting capacitance generated by oscillation, is structured to detect an acceleration in an axis direction and an angular velocity of a rotation around an axis, for example the first embodiment, or is structured to detect an acceleration in an axis direction and two angular velocities of two rotations around two axes, for example the second embodiment. Alternatively, not limited to the forgoing embodiments, the acceleration and angular velocity detection device may be structured to detect a predetermined number (for example any number within one to three) of accelerations in axis directions and a predetermined number (for example any number within one to three) of angular velocities of rotations around axes. In a case where more accelerations and angular velocities needs to be detected compared with the forgoing embodiments, the acceleration and angular velocity detection device needs more switching elements formed in the input switching portion and the integration capacitance element switching portion. Therefore, the circuit area decreasing effect is increased further more.

What is claimed is:

1. An acceleration and angular velocity detection device comprising:
    a first oscillation element and a second oscillation element that are movable in a direction along a first axis and a direction along a second axis, the first axis being perpendicular to the second axis;
    an oscillating portion oscillating the first oscillation element and the second oscillation element in opposite directions along the first axis;
    a first detection capacitance element and a second detection capacitance element whose capacitances change in a complementary way in accordance with a displacement of the first oscillation element in the direction along the second axis;
    a third detection capacitance element and a fourth detection capacitance element whose capacitances change in a complementary way in accordance with a displacement of the second oscillation element in the direction along the second axis;
    a charge amplifier having a fully differential structure, the charge amplifier converting a capacitance change in the first detection capacitance element, the second detection capacitance element, the third detection capacitance element and the fourth detection capacitance element to a voltage signal and outputting the voltage signal as an output signal; and
    a detecting portion detecting an acceleration in the direction along the second axis and an angular velocity of a rotation around a third axis that is perpendicular to the first axis and the second axis according to the output signal of the charge amplifier,
    wherein the charge amplifier includes an operational amplifier, an input switching portion, a first integration capacitance group, a second integration capacitance group, an integration capacitance element switching portion, and a reset switching portion, the input switching portion switches over an input signal to the operational amplifier, the integration capacitance element switching portion controls a switchover of coupling states of the first integration capacitance group and the second integration capacitance group so that at least one of the first integration capacitance group and the second integration capacitance group is coupled to the operational amplifier to work as a feedback capacitance, and the reset switching portion short-circuits two terminals of each of the first integration capacitance group and the second integration capacitance group,
    wherein the detecting portion includes a switch controlling portion controlling the input switching portion, the integration capacitance element switching portion and the reset switching portion,
    wherein, in a first detecting state, the switch controlling portion controls the input switching portion in such a manner that the capacitance change in the first detection capacitance element and the capacitance change in the third detection capacitance element are added and are input to one input terminal of the operational amplifier, and the capacitance change in the second detection capacitance element and the capacitance change in the fourth detection capacitance element are added and are input to the other input terminal of the operational amplifier, and the switch controlling portion controls the integration capacitance element switching portion in such a manner that the first integration capacitance group works as the feedback capacitance,
    wherein, in a second detecting state, the switch controlling portion controls the input switching portion in such a manner that the capacitance change in the first detection capacitance element and the capacitance change in the fourth detection capacitance element are added and are input to one input terminal of the operational amplifier, and the capacitance change in the second detection capacitance element and the capacitance change in the third detection capacitance element are added and are input to the other input terminal of the operational amplifier, and the switch controlling portion controls the integration capacitance element switching portion in such a manner that the second integration capacitance group works as the feedback capacitance,
    wherein the switch controlling portion controls the reset switching portion to short-circuit the two terminals of one of the first integration capacitance group and the second integration capacitance group after a switchover between the first detecting state and the second detecting state, and wherein the detecting portion detects the acceleration in the direction along the second axis according to the output signal of the charge amplifier in the first detecting state, and detects the angular velocity of the rotation around the third axis according to the output signal of the charge amplifier in the second detecting state.

2. The acceleration and angular velocity detection device according to claim 1, wherein the input switching portion includes a plurality of switching elements provided in a plurality of signal paths between the first detection capacitance element to the fourth detection capacitance element and the operational amplifier, wherein the integration capacitance element switching portion includes a plurality of switching elements provided in a plurality of signal paths between the first integration capacitance group to the second integration capacitance group and the operational amplifier, wherein each of the plurality of switching elements includes a main switch and a dummy switch having short-circuited two terminals and coupled with the main switch in series, and wherein each of the main switch and the dummy switch is provided by a CMOS analogue switch.

3. The acceleration and angular velocity detection device according to claim 1, further comprising:

a third oscillation element that is movable in the direction along the first axis and in a direction along the third axis; and a fifth detection capacitance element and a sixth detection capacitance element whose capacitances change in a complementary way in accordance with a displacement of the third oscillation element in the direction along the third axis, wherein the oscillating portion oscillates the third oscillation element in the direction along the first axis, wherein the charge amplifier further includes a third integration capacitance group, wherein, in a third detecting state, the switch controlling portion controls the input switching portion in such a manner that the capacitance change in the fifth detection capacitance element is input to one input terminal of the operational amplifier, and the capacitance change in the sixth detection capacitance element is input to the other input terminal of the operational amplifier, and the switch controlling portion controls the integration capacitance element switching portion in such a manner that the third integration capacitance group works as the feedback capacitance, and wherein the detecting portion detects an angular velocity of a rotation around the second axis according to the output signal of the charge amplifier in the third detecting state.

4. The acceleration and angular velocity detection device according to claim 3, wherein the first integration capacitance group includes a plurality of integration capacitance elements, the second integration capacitance group includes a plurality of integration capacitance elements and the third integration capacitance group includes a plurality of integration capacitance elements, wherein each of the plurality of integration capacitance elements included in the first integration capacitance group, the second integration capacitance group and the third integration capacitance group has different capacitance to each other, and wherein the switch controlling portion controls the integration capacitance element switching portion in such a manner that one of the plurality of integration capacitance elements included in the first integration capacitance group, the second integration capacitance group or the third integration capacitance group works as the feedback capacitance.

5. The acceleration and angular velocity detection device according to claim 1, wherein one electrode of the first detection capacitance element and one electrode of the second detection capacitance element are coupled in common, wherein the other electrode of the first detection capacitance element and the other electrode of the second detection capacitance element are respectively coupled to one input terminal of the operational amplifier and the other input terminal of the operational amplifier, wherein one electrode of the third detection capacitance element and one electrode of the fourth detection capacitance element are coupled in common, wherein the input switching portion includes a first switching element, a second switching element, a third switching element, and a fourth switching element, the first switching element is coupled between the other electrode of the fourth detection capacitance element and one input terminal of the operational amplifier, the second switching element is coupled between the other electrode of the third detection capacitance element and the other input terminal of the operational amplifier, the third switching element is coupled between the other electrode of the third detection capacitance element and one input terminal of the operational amplifier, the fourth switching element is coupled between the other electrode of the fourth detection capacitance element and the other input terminal of the operational amplifier, wherein, in the first detecting state, the switch controlling portion switches off the first switching element and the second switching element, and switches on the third switching element and the fourth switching element, and wherein, in the second detecting state, the switch controlling portion switches on the first switching element and the second switching element, and switches off the third switching element and the fourth switching element.

6. The acceleration and angular velocity detection device according to claim 1, wherein one electrode of the first detection capacitance element and one electrode of the second detection capacitance element are coupled in common, wherein one electrode of the third detection capacitance element and one electrode of the fourth detection capacitance element are coupled in common, wherein the input switching portion includes a first switching element, a second switching element, a third switching element, a fourth switching element, a fifth switching element, and a sixth switching element, the first switching element is coupled between the other electrode of the fourth detection capacitance element and one input terminal of the operational amplifier, the second switching element is coupled between the other electrode of the third detection capacitance element and the other input terminal of the operational amplifier, the third switching element is coupled between the other electrode of the third detection capacitance element and one input terminal of the operational amplifier, the fourth switching element is coupled between the other electrode of the fourth detection capacitance element and the other input terminal of the operational amplifier, the fifth switching element is coupled between the other electrode of the first detection capacitance element and one input terminal of the operational amplifier, the sixth switching element is coupled between the other electrode of the second detection capacitance element and the other input terminal of the operational amplifier, wherein, in the first detecting state, the switch controlling portion switches off the first switching element and the second switching element, and switches on the third switching element, the fourth switching element, the fifth switching element and the sixth switching element, and wherein, in the second detecting state, the switch controlling portion switches on the first switching element, the second switching element, the fifth switching element and the sixth switching element, and switches off the third switching element and the fourth switching element.

7. The acceleration and angular velocity detection device according to claim 6, wherein, in a first diagnosis state, the switch controlling portion switches off the first switching element, the second switching element, the third switching element and the fourth switching element, and switches on the fifth switching element and the sixth switching element, wherein, in a second diagnosis state, the switch controlling portion switches off the first switching element, the second switching element, the fifth switching element and the six switching element, and switches on the third switching element and the fourth switching element, and wherein the detecting portion diagnoses the first oscillation element based on the output signal of the charge amplifier in the first diagnosis state, and the detecting portion diagnoses the second oscillation element based on the output signal of the charge amplifier in the second diagnosis state.

\* \* \* \* \*